United States Patent [19]
Manor et al.

[11] Patent Number: 6,148,926
[45] Date of Patent: Nov. 21, 2000

[54] GROUND CLEARING APPARATUS AND METHOD FOR TRANSPORTING SAME

[75] Inventors: Gedalyahu Manor; Dan Wolf, both of Haifa, Israel

[73] Assignee: Technion Research & Development Foundation Ltd., Haifa, Israel

[21] Appl. No.: 09/155,564

[22] PCT Filed: Mar. 30, 1997

[86] PCT No.: PCT/IL97/00113

§ 371 Date: Feb. 3, 1999

§ 102(e) Date: Feb. 3, 1999

[87] PCT Pub. No.: WO97/36469

PCT Pub. Date: Oct. 9, 1997

[30] Foreign Application Priority Data

Mar. 1, 1996 [IL] Israel ......................................... 117763

[51] Int. Cl.$^7$ .................................................. A01B 33/00
[52] U.S. Cl. ................................ 172/45; 172/2; 172/123; 172/245
[58] Field of Search ............................. 172/45, 5, 6, 245, 172/810, 122, 123, 125, 96, 2, 253, 254, 246; 37/403, 301; 56/12.7, 294, DIG. 1, 504; 89/1.13

[56] References Cited

U.S. PATENT DOCUMENTS

| 2,718,741 | 9/1955 | Meldahl ..................................... 172/45 |
| 3,754,603 | 8/1973 | Bogie . |
| 4,220,184 | 9/1980 | Hallett et al. .......................... 172/45 X |
| 4,765,221 | 8/1988 | Sombrowski . |
| 4,862,969 | 9/1989 | Jobst et al. . |
| 4,930,581 | 6/1990 | Fleischer et al. . |
| 4,987,819 | 1/1991 | Brown . |
| 5,007,325 | 4/1991 | Macwatt . |
| 5,103,624 | 4/1992 | Marshall ............................... 172/45 X |
| 5,666,794 | 9/1997 | Vought et al. ......................... 172/45 X |

FOREIGN PATENT DOCUMENTS

| 3127856 | 2/1983 | Germany . |
| 3839032 | 5/1990 | Germany . |
| 2106045 | 2/1985 | United Kingdom . |
| 2106454 | 9/1985 | United Kingdom . |

*Primary Examiner*—Victor Batson
*Attorney, Agent, or Firm*—Browdy and Neimark

[57] ABSTRACT

Ground clearing apparatus (10) and a method for transporting the apparatus are provided. The ground clearing apparatus (10) includes a plurality of ground clearing tools (20) attached to a rotating shaft (18). The ground clearing tools include a chain (22) having a plurality of links and a hammer (24) attached to one end of the chain (22). The rotation of the shaft (18) causes the hammer (24) to strike objects in its path and generally mill the ground surface.

17 Claims, 7 Drawing Sheets

GROUND CLEARING APPARATUS AND METHOD FOR TRANSPORTING SAME

FIELD OF THE INVENTION

The present invention relates to ground clearing and milling apparatus and to a system for attaching such apparatus to vehicles.

BACKGROUND OF THE INVENTION

Apparatus and systems are known for clearing land mines. Commonly, land mine clearing apparatus is adapted for mounting on tracked vehicles which travel the ground to be cleared. Examples of such apparatus are described in U.S. Pat. No. 4,765,221 to Sombrowski, UK Patent Nos. 2,106,454 and 2,106,045, and German Patent DE 31 27 85 6 to Schaubele.

Pat. No. 4,765,221 describes an arrangement for receiving a clearing device having a rotatable tool for clearing land mines. The device can be pivoted through 90° to facilitate transportation.

In the known prior art apparatus, during clearing, the clearing shaft is driven in rotation and the clearing tools attached to the shaft penetrate into the ground because of the high movement energy and throw the ground and any mines forward. The clearing shaft is generally supported on a frame to which it is connected by hydraulic units.

Clearing tools which rotate about the clearing shaft are generally hammer like elements which are rigidly attached to the shaft so as to provide sufficient force to clear the ground and the mines. Such rigidly fixed devices are likely to be easily shattered by the impact forces.

German Patent DE 31 27 85 6 to Schaubele describes clearing tools which consists of hammers which are pivotably attached to the clearing shaft to provide a certain degree of flexibility. UK Patent No. 2,106,045 describes land mine clearing apparatus which includes clearing shafts having impact elements secured by cables attached thereto to provide flexibility in one direction.

UK Patent No. 2,106,454 describes means for adjusting the height of the land mine clearing apparatus. These means comprise probe elements which are pivotably attached to the outer arms of the unit supporting the clearing shaft. The probe elements, which are in contact with the ground, send indications to a control device within the vehicle. The operator can then adjust the axis of tilt of the device accordingly.

The above referenced prior art devices though suitable for clearing land mines, are not normally suitable for general ground clearing of boulders and similar objects.

SUMMARY OF THE PRESENT INVENTION

It is an object of the present invention to provide ground clearing and milling apparatus which overcomes the limitations and disadvantages of prior art apparatus.

It is a further object of the present invention to provide ground clearing apparatus which can be used for clearing land mines and which overcomes the limitations and disadvantages of prior art apparatus.

It is a further object of the present invention to utilize chains to provide flexibility in more than one direction without sustaining damage due to impact.

It is a still further object of the present invention to provide ground clearing apparatus which can be adapted for the attachment of a second tool, such as a bulldozer for other excavation and clearing purposes.

It is a still further object of the present invention to provide ground clearing apparatus which allows the clearing tool apparatus to be disposed into a position for transporting.

It is a still further object of the present invention to provide ground clearing apparatus which includes a separate power unit connecting the driving vehicle to the clearing tool.

It is a still further object of the present invention to provide ground clearing apparatus in which the level and tilt of the apparatus can be automatically adjusted. The adjustment means can include mechanical, ultrasonic or radar means.

There is therefore provided, in accordance with a preferred embodiment of the present invention, ground clearing apparatus. The ground clearing apparatus includes a plurality of ground clearing tools attached to a rotating shaft. The ground clearing tools include a chain having a plurality of links and a hammer attached to one end of the chain. The rotation of the shaft causes the hammer to strike objects in its path and generally mill the ground surface. The shaft may be attached to a vehicle.

Furthermore, in accordance with a preferred embodiment of the present invention, the ground clearing apparatus further includes a second excavation attachment connected to the mounting unit.

There is also provided, in accordance with a further preferred embodiment of the present invention, ground clearing and excavation apparatus. The apparatus includes a mounting unit supported by a vehicle, ground clearing apparatus attached to the mounting unit, excavation apparatus attached to the mounting unit and a plurality of flexibly mounted elements for adjustably operating the ground clearing apparatus and the excavation apparatus to selectively operate either of the ground clearing apparatus or the excavation apparatus.

Additionally, in accordance with a preferred embodiment of the present invention, the ground clearing apparatus includes a mounting unit attached to a vehicle, a shaft attached to the mounting unit, a plurality of ground clearing tools attached to the shaft and means for rotating the shaft. Each of the plurality of ground clearing tools includes a chain having a plurality of links and a hammer attached to one end of the chain for striking objects within its path. The rotation of the shaft causes the plurality of hammers to strike the ground thereby generally milling the ground surface.

Furthermore, in accordance with a preferred embodiment of the present invention, the mounting unit includes a support stanchion having a pair of leg members and a plurality of support arms connected to each of the pair of leg members.

Furthermore, in accordance with a preferred embodiment of the present invention, the mounting unit includes a first pair of flange members, each of the first pair of flange members connecting one end of the support stanchion to each of the pair of leg members.

Furthermore, in accordance with a preferred embodiment of the present invention, the clearing shaft further includes a second pair of flange members hingedly attached to the clearing shaft.

Furthermore, in accordance with a preferred embodiment of the present invention, the ground clearing apparatus further includes a plurality of flexibly mounted elements for adjustably operating the clearing shaft and the mounting unit.

Furthermore, in accordance with a preferred embodiment of the present invention, the ground clearing apparatus further includes a plurality of flexibly mounted elements for adjustably operating the second excavation attachment.

Furthermore, in accordance with a preferred embodiment of the present invention, the plurality of flexibly mounted elements are hydraulically operated cylinder-piston units.

Furthermore, in accordance with a preferred embodiment of the present invention, the rotating means includes a power unit.

Furthermore, in accordance with a preferred embodiment of the present invention, the power unit is attached to the vehicle or alternatively is remotely controlled.

Additionally, in accordance with a preferred embodiment of the present invention, the apparatus further includes at least one sensing device attached thereto. The sensing device includes a tracking probe attached to a support arm, for tracking the ground being cleared, a sensor responsive to the rise and fall of the support arm and a control unit connected to the sensor for processing the rise and fall data and for correspondingly adjusting the ground clearing apparatus in accordance with changes in the data.

Finally, in accordance with a preferred embodiment of the present invention, there is therefore provided a method for transporting ground clearing apparatus on a vehicle. The ground clearing apparatus includes a mounting unit attached to the vehicle, a shaft attached to the mounting unit, a first pair of hingedly attached members, each of first pair of hingedly attached members attached to one end of the mounting unit and a second pair of hingedly attached members, each of second pair of hingedly attached members attached to one end of the shaft. The method includes the steps of:

a. foldably locking the first pair of hingedly attached members onto the mounting unit; and b. foldably locking the second pair of hingedly attached members onto the shaft.

The folded width of the ground clearing apparatus is approximately the same width of the vehicle.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
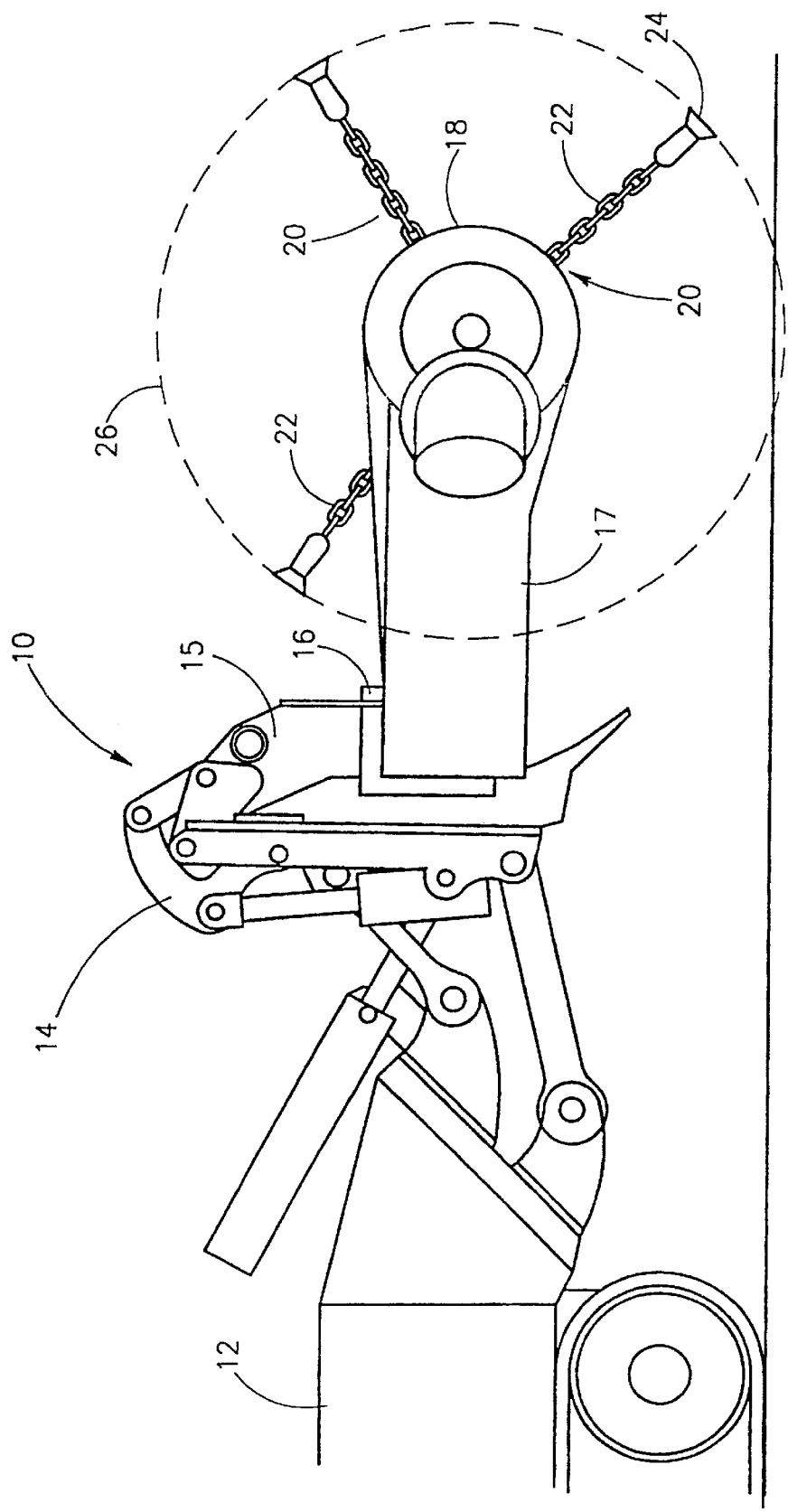
FIG. 1 is a side view illustration of ground clearing and milling apparatus in accordance with a preferred embodiment of the invention.
Figure 2:
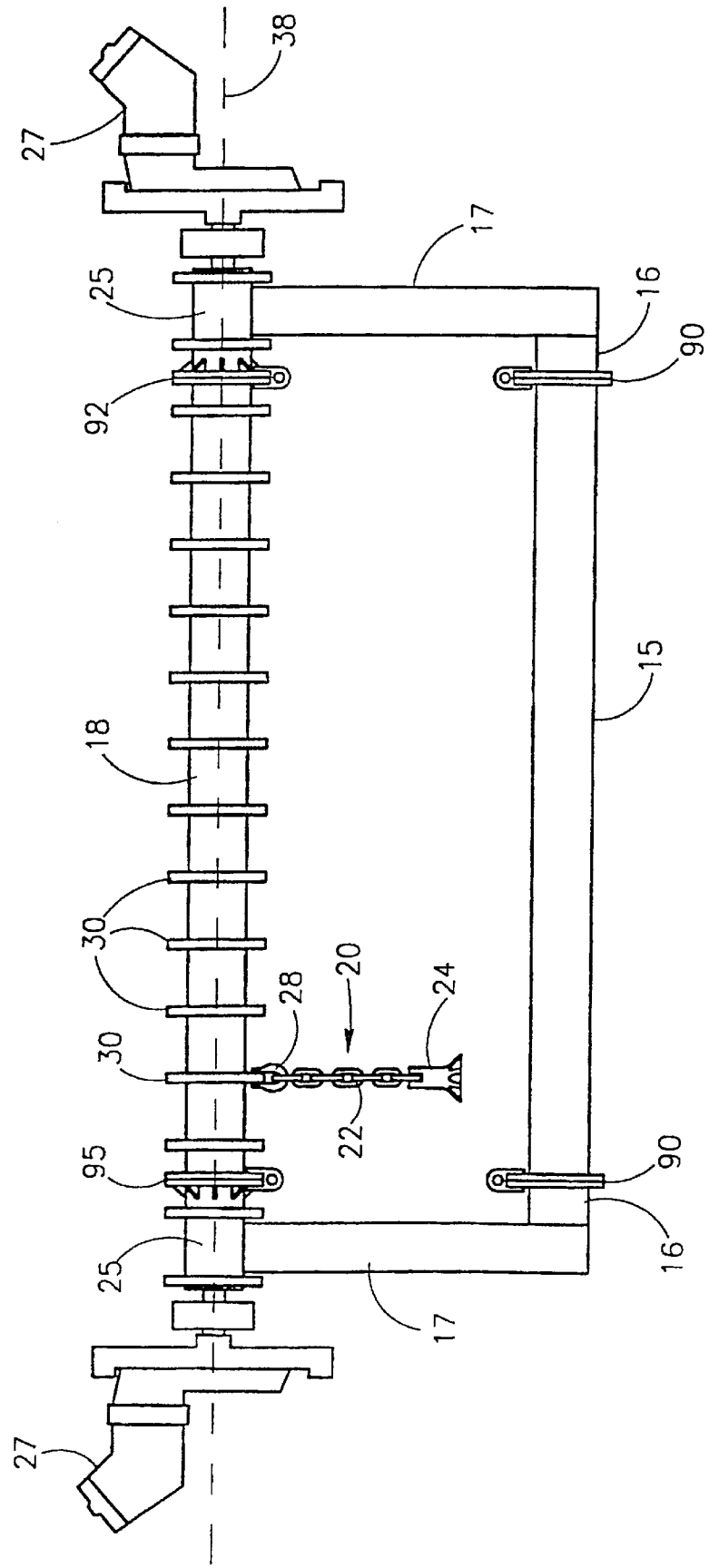
FIG. 2 is an plan view of the clearing shaft and clearing tool of the ground clearing apparatus of FIG. 1.
Figure 3:
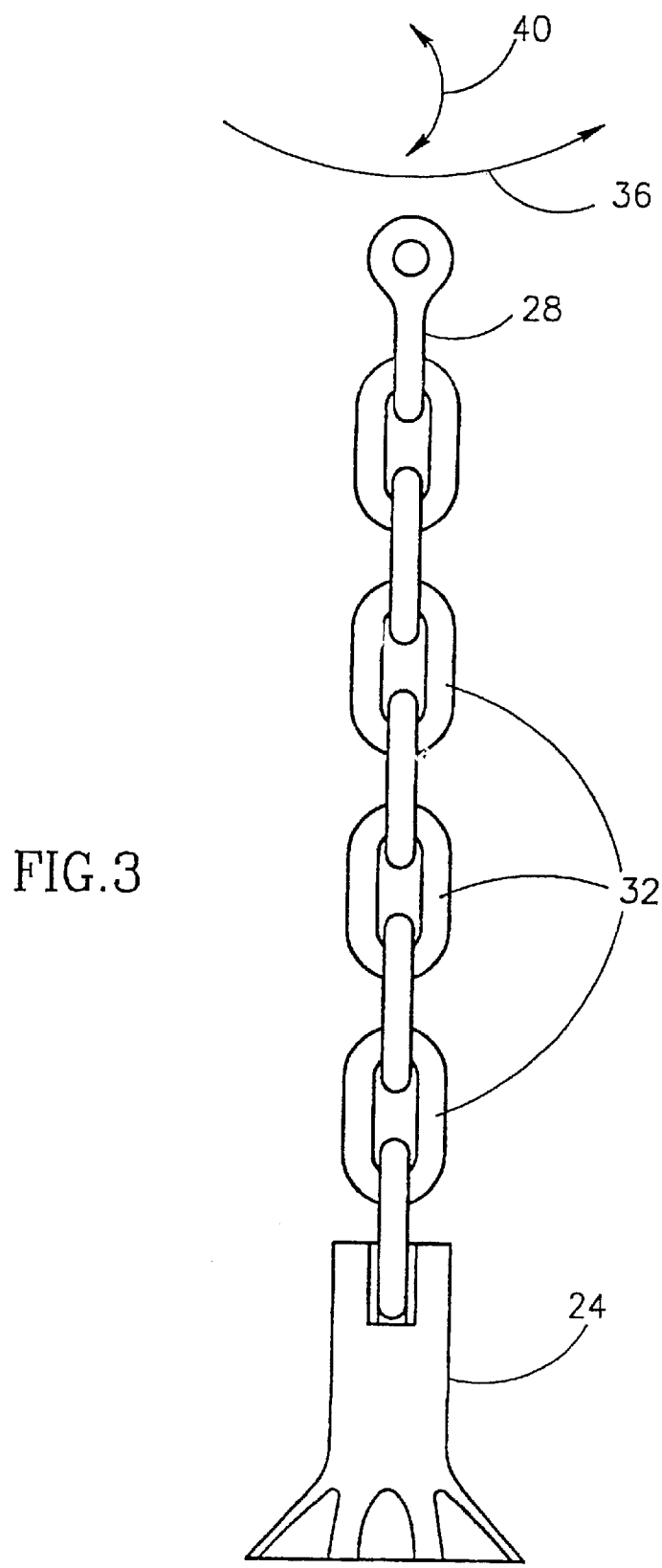
FIG. 3 is a detailed illustration of the clearing tool chain and hammer in accordance with a preferred embodiment of the invention.

Reference is now made to FIGS. 1–3. FIG. 1 illustrates apparatus for ground clearing and milling, generally designated 10, in accordance with a preferred embodiment of the invention. FIG. 2 is an plan view of the clearing shaft and the ground clearing tool and FIG. 3 is an enlarged detail of the ground clearing tool.

The ground clearing apparatus 10 is shown, for the purposes of example, attached to a tracked vehicle 12 by means of a mounting unit, generally designated 14. It will be appreciated by persons skilled in the art that ground clearing apparatus 10 can also be attached to any type of vehicle including wheeled vehicles and is not restricted to a tracked or military vehicles.

As best seen in FIG. 1, mounting unit 14 comprises a support stanchion 15 which retainingly supports a clearing shaft 18. Mounting unit 14 comprises any suitable configuration of flexibly attached elements and is preferably hydraulically operated.

A plurality of tool clearing elements 20 are attached to clearing shaft 18. Each tool clearing element 20 generally comprises a chain 22, to one end of which a hammer 24 is attached.

At least one drive unit 27, is operable to rotate clearing shaft 18 which is generally horizontal to the ground being cleared. The rotation of clearing shaft 18 causes the hammer 24 at the end of the chain 22 to move in a rotational direction, indicated by dashed line 26. The ground and any boulders (or similar objects, such as mines) in the path of the hammers are broken and thrown forward away from the vehicle 12.

Support stanchion 15 is any suitable member such as a steel "I" or square-section or "U-channel. Support stanchion 15 comprises a foldable leg attachment, generally designated 16, connected at each end of the stanchion 15. At least two support arms 17 for retainingly supporting a clearing shaft 18, are attached to each of the leg attachments 16. Support stanchion 15 further comprises a pair of foldable members 90 connecting leg attachments 16 to the support stanchion 15.

Clearing shaft 18 is supported at each end by the support arms 17. Support arms 17 are preferably hydraulically operable, via the mounting unit 14, by a drive unit (not shown) controlled by the vehicle operator. Clearing shaft 18 is rotatable within the support arms 17 and preferably is supported by bearings 25.

Each of the plurality of tool clearing elements 20 are attached to clearing shaft 18 by means of a shackle pin 28 pivotally attached to an annulus 30. Each annulus 30 is welded, or otherwise suitably attached to clearing shaft 18. Alternatively, the tool clearing elements 20 may be directly attached to clearing shaft 18 by any suitable means known in the art. Clearing shaft 18 further comprises a pair of flanges 92, which will be described in further detail hereinbelow.

Reference is now made to FIG. 3 which illustrates a preferred embodiment of chain 22 and hammer 24. Chain 22 comprises a plurality of links 32. Chain 22 gives the tool clearing elements 20 flexibility in all directions. Chain 22 is freely movable along an arc described by line 36, generally parallel with the longitudinal axis 38 (FIG. 2) of clearing shaft 18 and secondly chain 22 can freely describe an arc, shown by line 40. Arc line 40 is generally perpendicular to longitudinal axis 38 of clearing shaft 18. Since tool clearing elements 20 can flexibly react in two directions to the impact forces caused by hitting an object such as a boulder or mine, the forces on the other rigid components, such as support arm 15 and clearing shaft 18 are reduced and these latter components are less likely to be damaged by buckling, for example.

Figure 4:
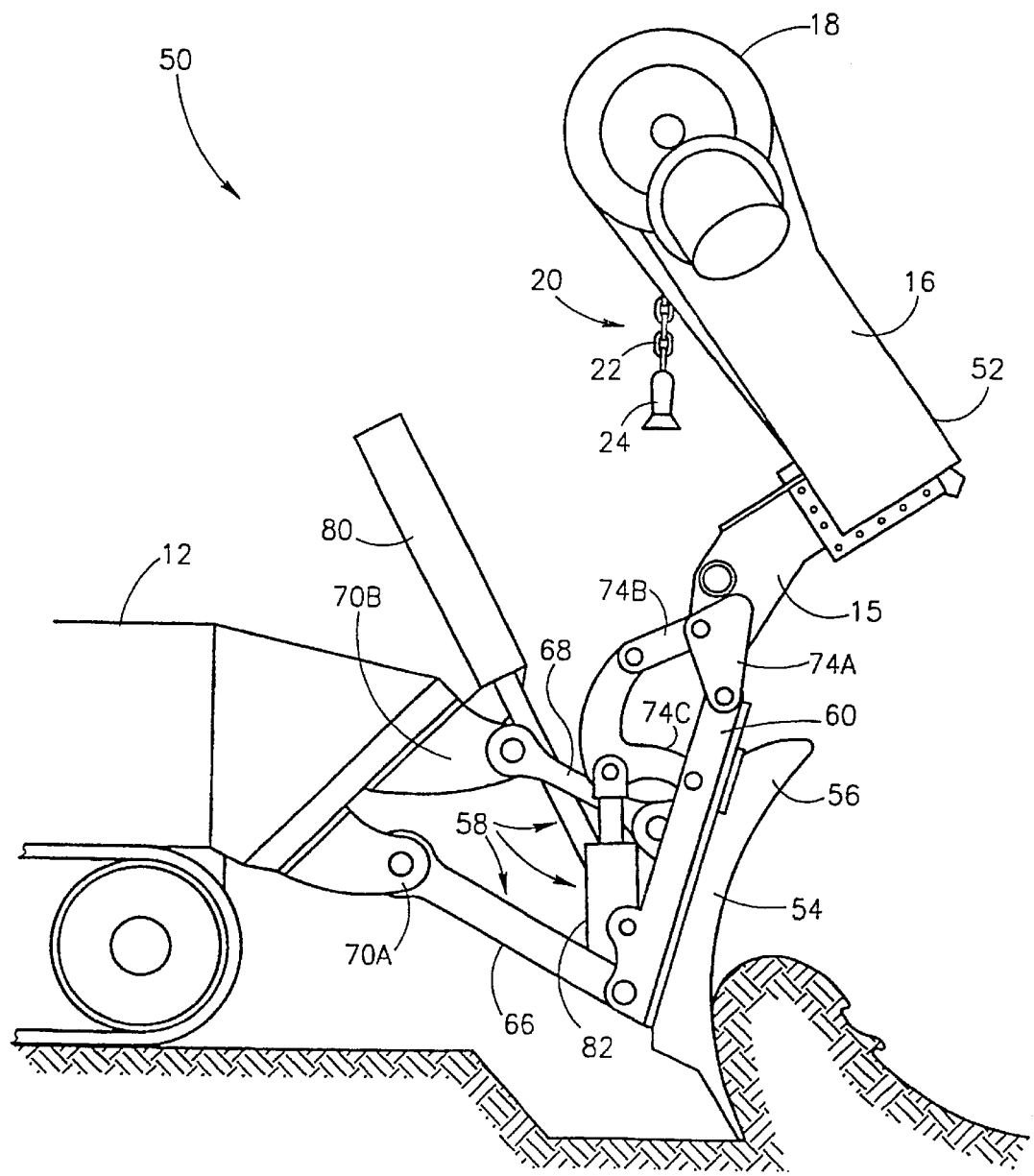
FIG. 4 is a side view illustration of ground clearing apparatus in accordance with a further preferred embodiment of the invention.

Reference is now made to FIG. 4, which illustrates a further embodiment of the ground clearing apparatus 50. Ground clearing apparatus 50 comprises a ground clearing and milling unit 52 and a supplementary attachment, generally designated 54.

Ground clearing unit 52 is similar to the ground clearing apparatus 10, as described hereinabove with respect to the embodiment of FIG. 1. Elements of this embodiment of the invention which are similar to elements which have been previously described with respect to the preferred embodiment hereinabove, are similarly designated and will not be further described.

Ground clearing apparatus 50 may be used in one of two configurations. The ground clearing unit 52 is shown raised in an elevated position above the line of sight of the vehicle operator. By suitably adjusting the hydraulic components of mounting unit 14, support arm 15 can be raised allowing the ground clearing apparatus 50 to be used for moving earth, for example by using the supplementary bulldozer attachment 54.

By raising bulldozer attachment 54 and lowering ground clearing unit 52, the ground clearing apparatus 50 can then be used to clear boulders or mines as described hereinabove with respect to the embodiment of FIG. 1.

Attachment 54 may be any suitable implement, such as bulldozer blade 56 suitable for moving earth or any other digging implement. Attachment 54 is attached to mounting unit 14 by a plurality of flexibly mounted elements, generally designated 58.

Flexibly mounted elements 58 comprise hydraulically operated ram and pistons, as are well known in the art. The arrangement of flexibly mounted elements 58, which are described hereinbelow, are for the purposes of example only, and without in any way limiting to the scope of the invention.

A support bar 60 is welded or otherwise suitably attached to bulldozer attachment 54. A pair of lower links, referenced 66 and an upper center link 68, are pivotally attached to support bar 60, approximately at the bottom and middle of the support bar 60. Lower links 66 are pivotally attached to link 70a which is also attached to vehicle 12. The pair of lower links 66 are used for side movement of attachment 54 and comprise a first fixed link and a second free link. The fixed link is firmly fixed to support bar 60 while the second free link is pivotally attached to support bar 60. Upper center link 68 pivotally connects support bar 60 to link 70b.

A plurality of pairs of links, referenced 74a, 74b and 74c are pivotally attached to each other. Link 74a is further attached to the top of support bar 60 and link 74c is further attached proximate to the top of support bar 60. Link 74a is welded, or otherwise firmly fixed, to support arm 15. Link 74b is also pivotally attached to support arm 15.

The flexibly mounted elements 58 comprise a first pair of hydraulic units, referenced 80, which are pivotally attached to support bar 60, proximate to lower link 66 and a second pair of hydraulic units, referenced 82. The second pair of hydraulic units 82 connect the lower part of attachment 54 to link 74c.

In operation, hydraulic units 80, which are situated one on each side of vehicle 12, are used to level and tilt the lower part of attachment 54 and the milling unit 52 by selectively adjusting each of the pair of hydraulic units 80. Hydraulic units 82 are used to raise and lower ground clearing and milling unit 52 when it is not being used.

Figure 5:
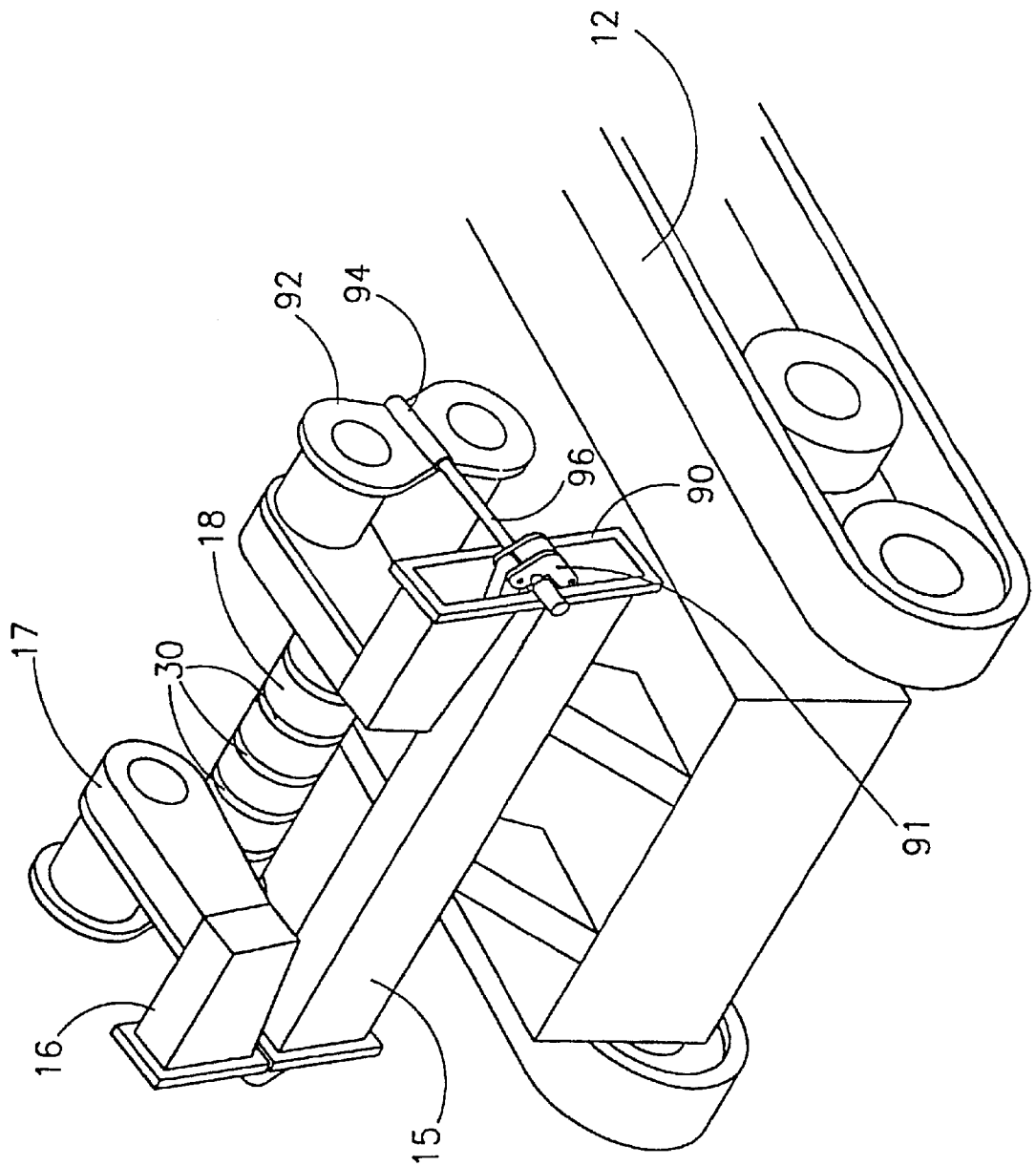
FIG. 5 is an illustration of the ground clearing apparatus according to FIG. 4 in the transport position.

Reference is now briefly made to FIG. 5 which illustrates the ground clearing apparatus 50 folded so as to be easily transportable.

Support stanchion 15 comprises a pair of flange members 90. Each flange member 90 is pivotably connected to the main support stanchion 15 by a pivot 91 and by hidden hydraulic cylinder units (not shown) which are used for folding the unit. Each flange member 90 is also fixedly connected to one of the leg attachments 16.

Clearing shaft 18 comprises a pair of flanges 92. Flanges 92 are pivotable about a hinge 94. A removable bar 96 connects each pivot 91 of the flange member 90 to hinge 94.

The length of main stanchion 15 is approximately two-thirds the overall length of clearing shaft 18. Similarly, the distance between flanges 92 is two-thirds the overall length of clearing shaft 18.

In the folded mode shown in FIG. 5, the clearing shaft 18 and main stanchion 15 are folded about flanges 92 and flange members 90, respectively. Removable bar 96 is then inserted through prepared pivot opening 91 in flange 90 and through hinge 94. The ground clearing apparatus 10 is maintained in its folded position by the hidden hydraulic cylinders which prevent the apparatus 10 from opening outwards. Thus, ground clearing apparatus 10 which is effectively part of its overall length in its folded position, that is about the width of the vehicle, can be transported on top of a vehicle without the need of a special transporter.

To prepare the ground clearing apparatus 10 for use, each leg attachment 16 is unfolded and connected to main stanchion 15, and bar 96 is removed. Clearing shaft 18, which is attached to support arms 17, is returned to its fully extendable position (FIG. 3).

Figure 6:
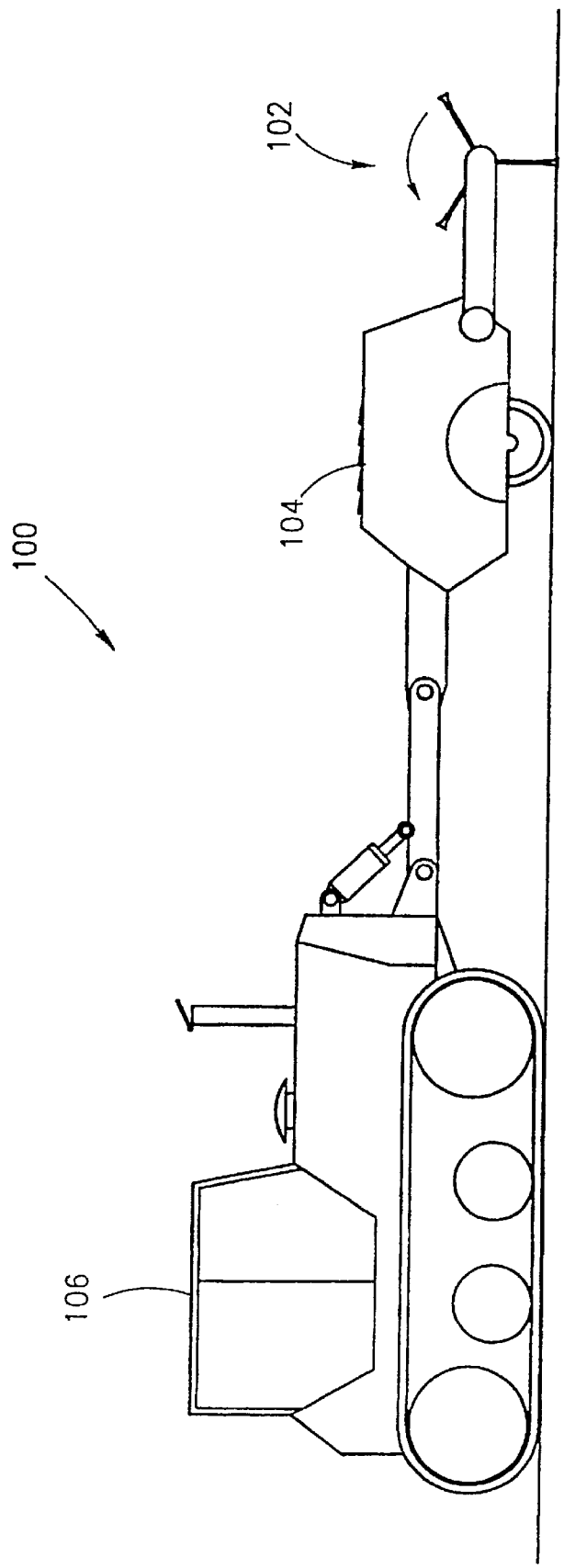
FIG. 6 is a schematic illustration of ground clearing apparatus in accordance with a further referred embodiment of the invention.

Reference is now briefly made to FIG. 6, which schematically illustrates ground clearing apparatus, generally designated 100, in accordance with a further referred embodiment of the invention.

Ground clearing apparatus 100 comprises a ground clearing unit 102 attached to a power unit 104. Power unit 104 is suitably connected to a vehicle 106. In this configuration, power for the ground clearing unit 102 is supplied directly by power pack unit 104. In an alternative configuration, power unit 104 can be connected to the rear of vehicle 106 in which case, power for the ground clearing unit 102 is supplied via vehicle 106. Power unit 104 can be any suitable power pack, known in the art.

It will be appreciated by persons skilled in the art that power unit 104 may be attached to any part of the vehicle 106 or ground clearing unit 10. Furthermore, power unit 104 need not be connected to a vehicle but could also operate independently as remote controlled unit. In this configuration, the power unit is connected to ground clearing unit 10 and receives commands by means of signals transmitted by a remote control unit of a type known in the art. This use of a remote control unit is especially advisable in areas exposed to explosive devices.

Figure 7:
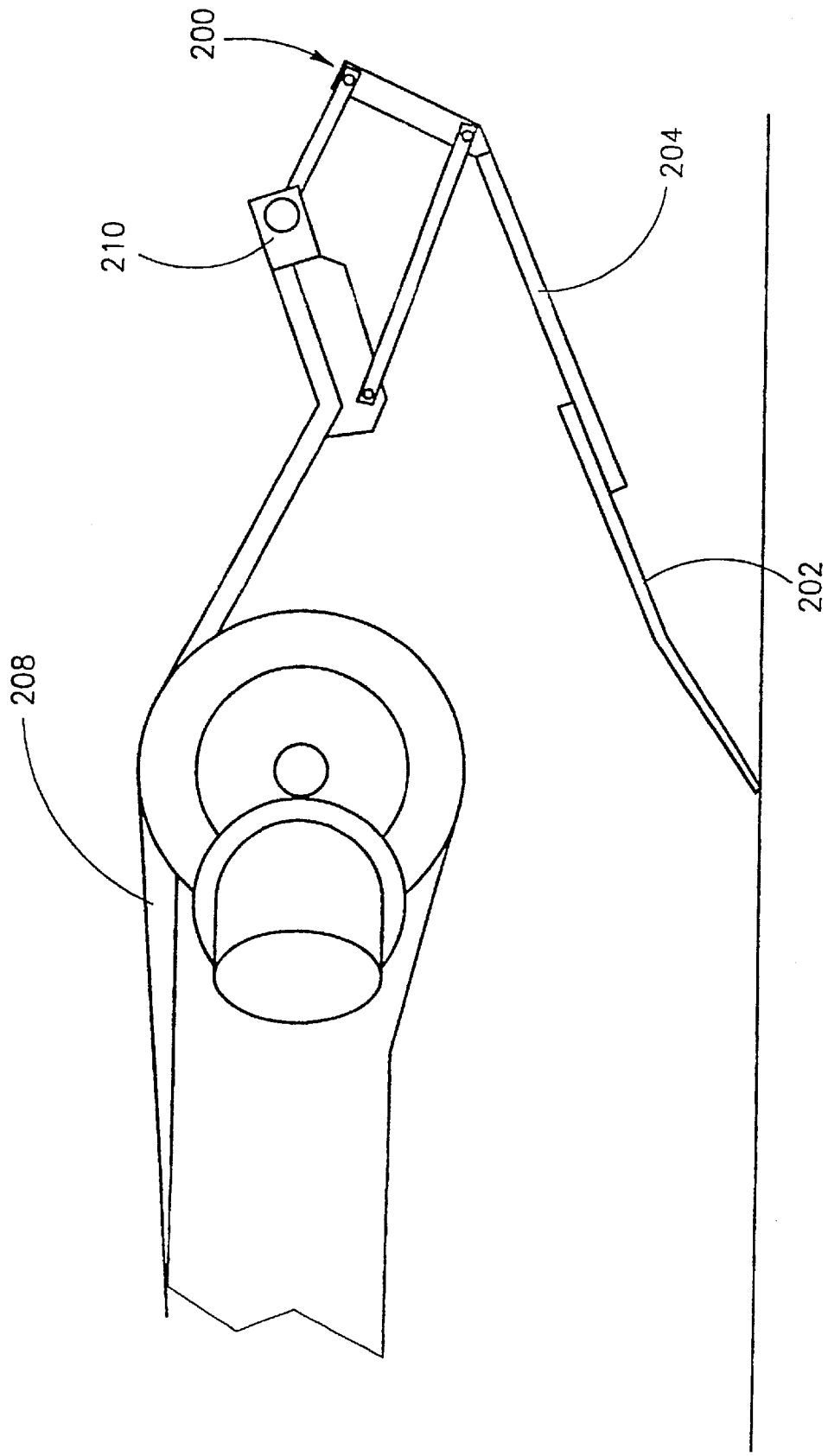
FIG. 7 is a side view illustration of a sensing device attached to the ground clearing apparatus of FIG. 1.

Reference is now briefly made to FIG. 7, which illustrates a sensing device 200 attached to ground clearing apparatus, described hereinabove with respect to FIGS. 1–6.

Sensing device 200 comprises a tracker 202 connected to a support arm 204. Support arm 204 is flexibly mounted to the ground clearing apparatus 10. A sensor 210 is attached to support arm 204 and connected to a control unit (not shown), preferably situated in the vehicle operator's cab.

In operation, as the vehicle 208 moves over undulating ground, tracker 202 follows the contours of the ground. As tracker 202 rises and falls with the ground contours, flexibly mounted support arm 204 likewise rises and falls. Sensor 210, which is responsive to movements of tracker 202, notes the changes in the height of support arm 204 and transmits the information to the control unit. The control unit processes the information received and adjusts the height of the ground clearing apparatus accordingly.

It will be appreciated by persons skilled in the art that any type of sensor 210 may be used, including radar and ultrasound units. For example, ultrasound units is particularly useful where there is little or no vegetation.

It will be further appreciated by persons skilled in the art that the present invention is suitable for both military and agricultural applications.

It will be appreciated by persons skilled in the art that the present invention is not limited to what has been particularly shown and described hereinabove. Rather the scope of the present invention is defined only by the claims which follow.

What is claimed is:

1. Ground clearing apparatus comprising:
   a. a mounting unit attached to a vehicle, said mounting unit comprising:
      i. a support stanchion;
      ii. a pair of leg members, each of said pair of leg members attached to one end of said support stanchion;
      iii. a plurality of support arms connected to each pair of said leg members; and
      iv. a first pair of flange members connecting said support stanchion to each of said pair of leg members;
   b. a shaft attached to said mounting unit, said shaft including a second pair of flange members hingedly attached to said shaft;
   c. a plurality of ground clearing tools attached to said shaft; each of said plurality of ground clearing tools comprising:
      i. a chain comprising a plurality of links; and
      ii. a hammer attached to one end of said chain, for striking objects within its path; and
   d. means for rotating said shaft, wherein the rotation of said shaft causes said plurality of hammers to strike the ground thereby generally milling the ground surface.

2. Ground clearing apparatus according to claim 1 further comprising a plurality of flexibly mounted elements for adjustably operating said clearing shaft and said mounting unit.

3. Ground clearing apparatus according to claim 2 wherein said plurality of flexibly mounted elements comprise hydraulically operated cylinder-piston units.

4. Ground clearing apparatus according to claim 2 wherein said plurality of flexibly mounted elements comprise hydraulically operated cylinder-piston units.

5. Ground clearing apparatus according to claim 1 further comprising a second excavation attachment connected to said mounting unit.

6. Ground clearing apparatus according to claim 5 further comprising a plurality of flexibly mounted elements for adjustably operating said second excavation attachment.

7. Ground clearing apparatus according to claim 5 wherein said rotating means comprises a power unit.

8. Ground clearing apparatus according to claim 7 wherein said power unit is attached to said vehicle.

9. Ground clearing apparatus according to claim 7 wherein said power unit is remotely controlled.

10. Ground clearing apparatus according to claim 1 further comprising at least one sensing device attached thereto, said sensing device comprising:
    a. a tracking probe attached to a support arm, for tracking the ground being cleared;
    b. a sensor responsive to a rise and fall of said support arm;
    c. a control unit connected to said sensor for processing data from said sensor and for correspondingly adjusting said ground clearing apparatus in accordance with changes in said data.

11. Ground clearing and excavation apparatus according to claim 10 wherein said mounting unit comprises a support stanchion comprising:
    a. a pair of leg members; and
    b. a plurality of support arms connected to each of said pair of leg members.

12. Ground clearing and excavation apparatus according to claim 10 wherein said shaft further comprises a second pair of flange members hingedly attached to said clearing shaft.

13. Ground clearing and excavation apparatus according to claim 12 wherein said plurality of flexibly mounted elements comprise hydraulically operated cylinder-piston units.

14. Ground clearing and excavation apparatus according to claim 10 further comprising a plurality of flexibly mounted elements for adjustably operating said shaft and said mounting unit.

15. Ground clearing and excavation apparatus according to claim 1 wherein said rotating means comprises a power unit.

16. Ground clearing and excavation apparatus according to claim 15 wherein said power unit is attached to said vehicle.

17. Ground clearing and excavation apparatus according to claim 15 wherein said power unit is remotely controlled.

* * * * *